United States Patent
Hara

Patent Number: 5,194,792
Date of Patent: Mar. 16, 1993

[54] TOOL CENTER POINT SETTING METHOD IN A ROBOT

[75] Inventor: Ryuichi Hara, Yamanashi, Japan

[73] Assignee: Fanuc Ltd., Minamitsuru, Japan

[21] Appl. No.: 613,713

[22] PCT Filed: Mar. 30, 1990

[86] PCT No.: PCT/JP90/00439

§ 371 Date: Jan. 28, 1991

§ 102(e) Date: Jan. 28, 1991

[87] PCT Pub. No.: WO90/11872

PCT Pub. Date: Oct. 18, 1990

[30] Foreign Application Priority Data

Mar. 31, 1989 [JP] Japan .................. 1-78393

[51] Int. Cl.$^5$ .................. B25J 9/10; B25J 9/22; G05B 19/18
[52] U.S. Cl. .................. 318/568.13; 318/568.19; 318/632; 901/42; 395/80
[58] Field of Search .................. 318/560-587, 318/632; 364/474.01-474.30, 167.01; 395/80-99; 901/3, 5, 9, 15, 18-23, 45, 47, 42

[56] References Cited

U.S. PATENT DOCUMENTS

| | | | |
|---|---|---|---|
| 4,590,578 | 5/1986 | Barto, Jr. et al. | 318/632 X |
| 4,598,380 | 7/1986 | Holmes et al. | 318/568 X |
| 4,623,971 | 11/1986 | Ailman et al. | 318/561 X |
| 4,706,000 | 11/1987 | Kishi et al. | 318/632 X |
| 4,771,222 | 9/1988 | Nakashima et al. | 318/572 |
| 4,816,733 | 3/1989 | Sakakibara et al. | 318/632 X |
| 4,894,788 | 1/1990 | Stelzer | 318/568.19 X |
| 4,969,108 | 11/1990 | Webb et al. | 901/42 |
| 4,972,347 | 11/1990 | Tarvin et al. | 318/568.13 X |
| 5,014,183 | 5/1991 | Carpenter et al. | 318/568.19 X |

*Primary Examiner*—Paul Ip
*Attorney, Agent, or Firm*—Staas & Halsey

[57] ABSTRACT

A tool center point setting method for a robot, capable of accurately and easily setting the tool center point without the need to remove a tool from the robot. After a tool (50) is mounted to a tool mounting surface (34), the tool center point (51) is set at the tool mounting surface center (35) by a robot control unit, and the robot is manually operated to position the tool center point at a reference point (61), this positioned state being taught. The robot control unit determines a matrix P1 based on the taught data. The tool center point is then set at a set point (36), and the robot is manually operated to position the set point at the reference point, the positioned state being taught. A matrix P2' is determined based on the taught data, and a transformation matrix TCP for conversion from a tool mounting surface coordinate system (200) to a tool coordinate system (300) is determined by equation $TCP = P1^{-1} \cdot P2'$. Alternatively, a matrix P2 representing a state where the set point is positioned at the reference point, with the tool center point kept set at the tool mounting surface center, is determined, and the transformation matrix is determined by equation $TCP = P1^{-1} \cdot P2 \cdot X$, using a matrix X representing the position and orientation of the set point in the tool mounting surface coordinate system.

13 Claims, 4 Drawing Sheets

TOOL CENTER POINT SETTING METHOD IN A ROBOT

BACKGROUND OF THE INVENTION

1. Field of the Invention

The present invention relates to a tool center point setting method in a robot, and more particularly, to a method capable of accurately and easily setting the tool center point without the need of removing a tool from a robot.

2. Description of the Related Art

Generally, during a robot operation, the target position and orientation of a robot tool, which are stated in a program created beforehand on an off-line basis and are represented by an orthogonal coordinate system, are converted into target values of joint angles of individual axes of the robot, and the joint angles are respectively controlled to these target joint angles. In this coordinate system conversion, various transformation matrices are used for the coordinate conversion between adjacent ones of various coordinate systems set for various sections of the robot. For example, employed is a transformation matrix for the coordinate conversion from a coordinate system set for the tool mounting surface into a tool coordinate system.

Conventionally, to determine the transformation matrix (i.e., to set the tool center point), at first, the distal end of a tool mounted to the tool mounting surface is positioned at a reference point whose coordinate position in a reference coordinate system is unknown, and a matrix $P1''$ representing the position and orientation of the center of the tool mounting surface in the reference coordinate system at that time is derived. Then, after the tool is removed from the tool mounting surface, the center of the tool mounting surface is brought to the reference position, and a matrix $P2''$ representing the position and orientation of the center of the tool mounting surface in the reference coordinate system at that time is derived. Assuming here that the transformation matrix is $TCP''$ and an unknown matrix representing the coordinate position of the reference point in the reference coordinate system is $P0''$, then the relationships represented by the following equations (1) and (2) stand between the matrices $P0''$, $P1''$ and $TCP''$ and between the matrices $P0''$ and $P2''$, respectively. By eliminating the unknown matrix $P0''$ from equation (1) using equation (2), the following equation (3) is derived. In equation (3), symbol $P1''^{-1}$ represents the inverse matrix of the matrix $P1''$. In this manner, according to the conventional method, the transformation matrix $TCP''$ is derived in accordance with equation (3).

$$P1'' \cdot TCP'' = P0'' \quad (1)$$

$$P2'' = P0'' \quad (2)$$

$$TCP'' = P1''^{-1} \cdot P2'' \quad (3)$$

In an actual working site, however, it is sometimes impossible to remove the tool from the tool mounting surface. In such a case, the conventional method cannot be used because it requires that the tool be removed to permit the center of the tool mounting surface to be positioned at the reference point.

Another tool center point setting method which does not require the removal of a tool is also known in the art. According to the method proposed in Japanese Patent Application No. 62-229820, for example, the operation of determining the center of the tool mounting surface while holding the distal end of the tool mounted to the tool mounting surface at the reference point is carried out with respect to at least four different orientations of the robot while the robot orientation is being changed. Then, the position of the tool center point is determined on the basis of the coordinate position of the center of a sphere passing through the at least four tool mounting surface centers thus determined.

According to this conventional method, however, in order to determine the position of the tool center point with a required accuracy, the operation of positioning the distal end of the tool at the reference point while the robot orientation is being changed must be repeatedly carried out a large number of times. This requires much labor. Moreover, the orientation of the tool cannot be determined.

SUMMARY OF THE INVENTION

An object of the present invention is to provide a method which is capable of accurately and easily setting the tool center point of a robot without the need of removing the tool from the robot.

To achieve the above object, according to one aspect of the present invention, there is provided a tool center point setting method which comprises the steps of: (a) providing in a robot a set point whose position and direction relative to a center of a tool mounting surface are known; (b) providing a reference point in a robot installation space; (c) setting a tool center point at the center of the tool mounting surface, positioning the tool center point at the reference point, and teaching first position and orientation of the tool center point at that time; (d) setting the tool center point at the set point, positioning the set point at the reference point, and teaching second position and orientation of the tool center point at that time; and (e) deriving a transformation matrix on the basis of an inverse matrix of a matrix representing the first position and orientation, and a matrix representing the second position and orientation.

According to another aspect of the present invention, there is provided a tool center point setting method comprising the steps of: (a) providing in a robot a set point whose position and direction relative to a center of a tool mounting surface are known; (b) providing a reference point in a robot installation space; (c) setting a tool center point at the center of the tool mounting surface, positioning the tool center point at the reference point, and teaching first position and orientation of the tool center point at that time; (d) positioning the set point at the reference point with the tool center point kept set at the center of the tool mounting surface, and teaching second position and orientation of the tool center point at that time; and (e) deriving a transformation matrix on the basis of an inverse matrix of a matrix representing the first position and orientation, a matrix representing the second position and orientation, and a matrix representing position and orientation of the set point in a coordinate system set for the tool mounting surface.

As described above, according to the present invention, the transformation matrix including a tool orientation, i.e., the tool center point, can be accurately and easily set by merely teaching the tool center point assumed when the tool center point is positioned sequentially at the reference point and the set point, or when the tool center point is set at the reference point and then the set point is positioned at the reference point. Accordingly, the robot operating performance such as tool path accuracy can be improved.

BRIEF DESCRIPTION OF THE PREFERRED EMBODIMENTS

Figure 1:
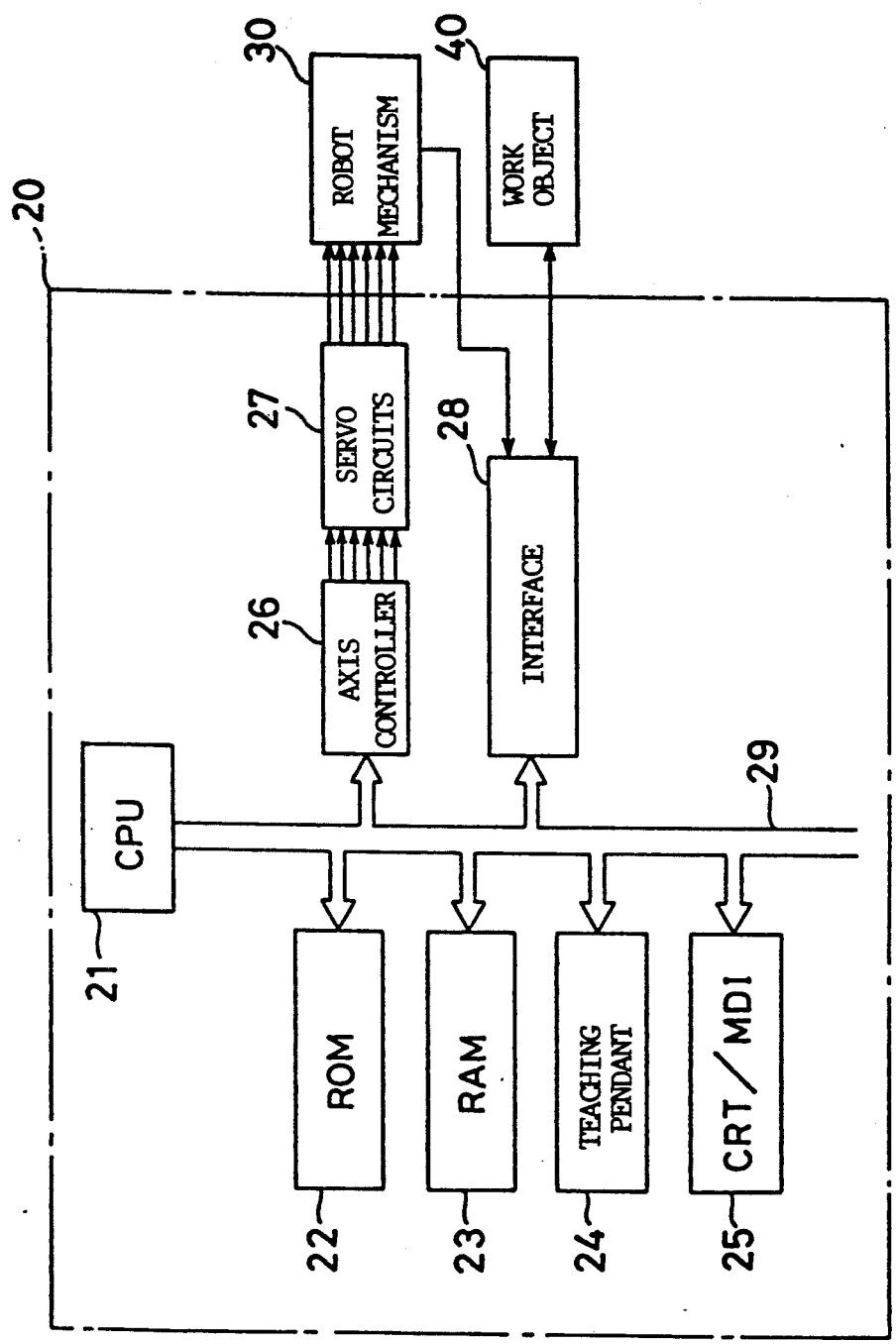
FIG. 1 is a schematic block diagram showing a robot to which a tool center point setting method according to a first embodiment of the present invention is applied.
Figure 2:
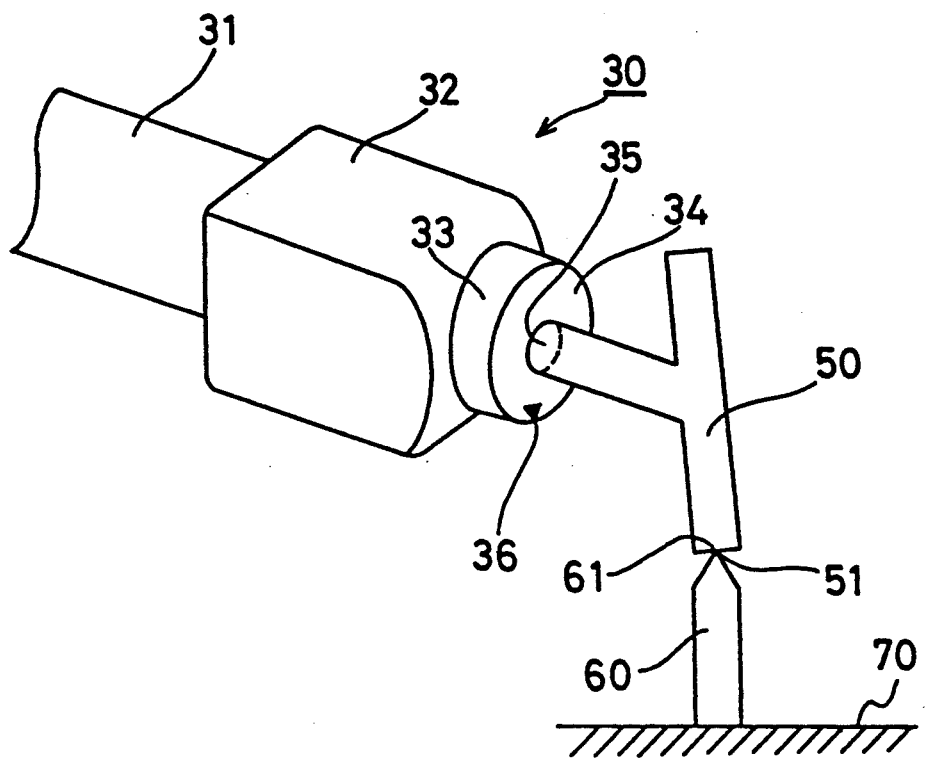
FIG. 2 is a schematic perspective view of a robot mechanism of FIG. 1 in a state wherein the distal end of a tool is positioned at a reference point (the distal end of a jig)
Figure 3:
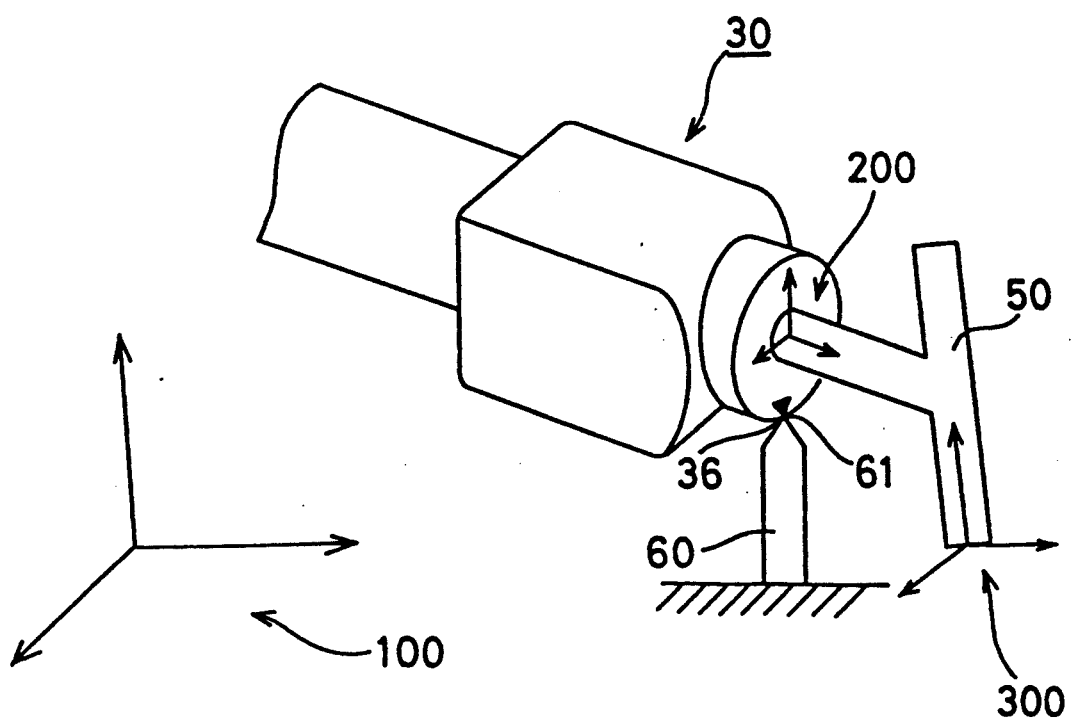
FIG. 3 is a schematic perspective view of the robot mechanism in a state in which a set point is positioned at the reference point.
Figure 4:
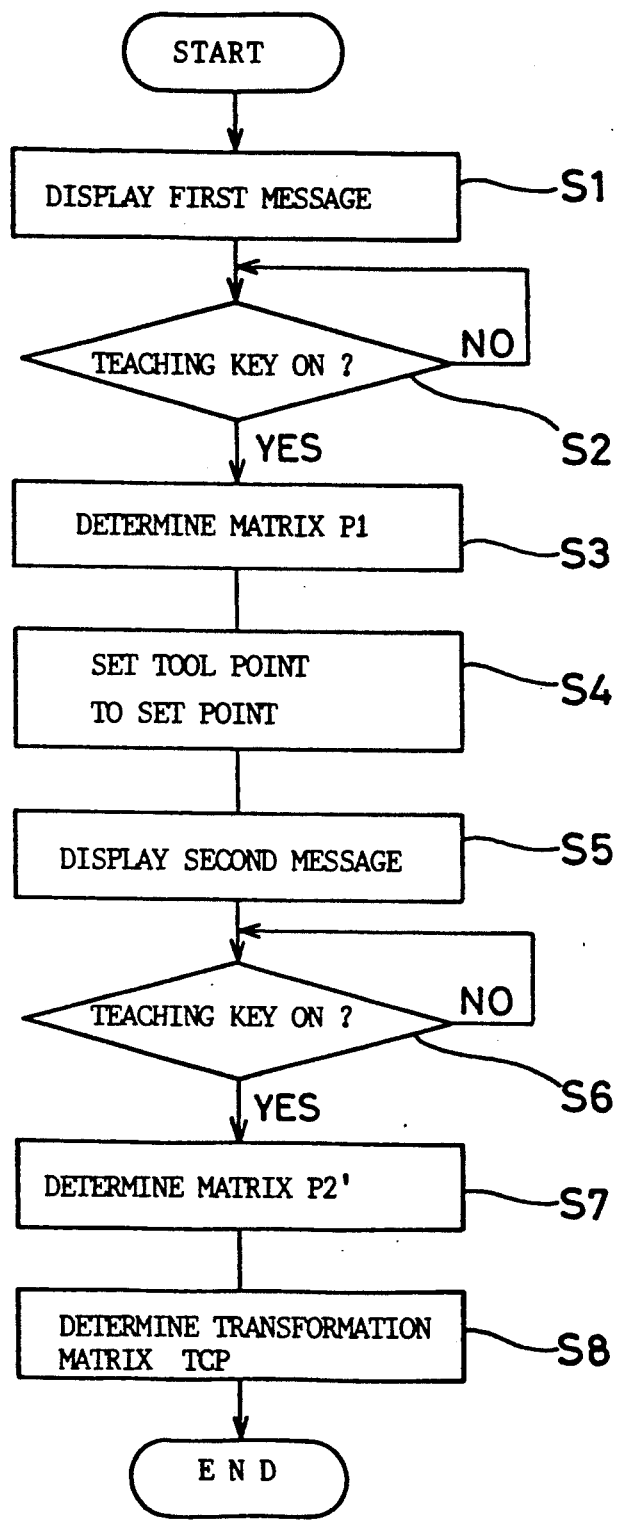
FIG. 4 is a flowchart of a tool center point setting process executed by a robot control unit of FIG. 1.

Referring to FIG. 1, a robot for embodying a tool center point setting method of a first embodiment of the present invention comprises a control unit 20, and a robot mechanism 30 for performing operations for a work object 40 under the control of the control unit 20. As shown in FIGS. 2 and 3, the robot mechanism 30 includes an arm 31 composed of a plurality of links (not shown) interconnected by means of joints (not shown), a wrist portion 32 mounted to the distal end of the arm, and servomotors (not shown) for individual axes. The wrist portion 32 includes a flange 33 secured at a distal end thereof, and a tool 50 is mounted to the distal end face (tool mounting surface) 34 of the flange 33. Reference numeral 51 denotes the distal end of the tool as the tool center point.

The control unit 20 is arranged to perform a coordinate conversion process, using various transformation matrices, on the target position and orientation of the tool 50, which are stated in a program created beforehand on an off-line basis and are represented by an orthogonal coordinate system, thereby deriving target joint angles of respective axes of the robot, and is arranged to drive the servomotors of the individual axes of the robot mechanism 30 in accordance with these target joint angles, to thereby control the position and orientation of the tool 50. The robot mechanism 30 also includes various sensors (not shown) for detecting rotation angles (joint angles of the respective axes) of the servomotors for the individual axes.

A set point 36 (indicated by triangle mark in FIGS. 2 and 3) is set at a predetermined portion of the robot mechanism 30, for example, at a predetermined position on the outer peripheral edge of the tool mounting surface 34. The direction of the set point 36 relative to the center 35 of the tool mounting surface and a distance between the set point and the center 35 (the position and orientation thereof in the coordinate system set for the tool mounting surface, described later) are known. Moreover, the set point 36 is set at such a portion that the set point can be positioned at the distal end 61 of a positioning jig 60, with the tool 50 kept mounted to the tool mounting surface 34. In a robot installation space, the jig 60 may be provided at an arbitrary position on a robot installation floor 70, for instance. In this respect, the jig has its distal end (reference point) 61 whose coordinate position in the reference coordinate system 100 may be unknown. In FIG. 3, reference numerals 200 and 300 denote the coordinate system for the tool mounting surface and the tool coordinate system, respectively. These coordinate systems are set such that their coordinate origins respectively coincide with the center 35 of the tool mounting surface and the center of the distal end 51 of the tool, for example.

Referring again to FIG. 1, the control unit 20 includes a central processing unit (hereinafter referred to as CPU) 21, a read-only memory (ROM) 22 storing a control program, and a random-access memory (RAM) 23 for storing various data including teaching data, various calculation results derived by the CPU 21, etc. The control unit 20 further comprises a teaching pendant 24 including a teaching key (not shown) for teaching the robot, a manual data input unit (hereinafter referred to as a CRT/MDI) 25 with a display, an axis controller 26, and an interface 28, and is arranged to drivingly control the servomotors of the individual axes of the robot mechanism 30. The aforementioned elements 22 to 26 and 28 are connected to the CPU 21 via a bus 29, and various sensors (not shown) provided on the robot mechanism 30 and the work object 40 are connected to the interface 28.

With reference to FIGS. 1 to 4, the tool center point setting process executed by the robot constructed as mentioned above will be explained.

After the tool 50 is mounted to the tool mounting surface 34 of the robot, an operator operates the CRT/MDI 25 to set the operation mode of the control unit 20 in a tool center point setting mode. At this time, a transformation matrix TCP (in this embodiment, each of the transformation matrix TCP and various matrices mentioned later is constituted by a homogeneous transformation matrix of $4 \times 4$) from the tool mounting surface coordinate system 200 to the tool coordinate system 300, employed for the aforementioned coordinate conversion process, is provisionally set to a $4 \times 4$ unit matrix determined beforehand as a default value. Then, the same transformation matrix is stored in a predetermined address area of the RAM 23. In other words, the tool coordinate system 300 is brought into coincidence with the tool mounting surface coordinate system 200. Namely, the tool center point (in this embodiment, the distal end 51 of the tool) is set at the center 35 of the tool mounting surface.

During a robot operation in the tool center point setting mode, a first message "POSITION TOOL CENTER POINT AT REFERENCE POINT" is displayed on the CRT screen of the CRT/MDI 25 under the control of the CPU 21 of the control unit 20 (step S1), and the CPU 21 waits for an operation of the teaching key by the operator. In response to the first message, the operator operates the teaching pendant 24 to manually drive the robot so that the distal end 51 of the tool (tool center point) is brought to be coincident with the distal end of the jig, i.e., the reference point (FIG. 2), and then turns on the teaching key. When it is determined in step S2 that the teaching key has been turned on, the CPU 21 determines a matrix P1 representing the position and orientation (first position) of the distal end 51 of the tool in the reference coordinate system in the thus positioned state, on the basis of the joint angles of the respective axes of the robot at that time and the transformation matrix TCP (the aforesaid unit matrix)

at that time. This matrix P1 is stored in a predetermined address area of the RAM 23 (step S3). Here, assuming that an unknown matrix representing the coordinate position of the reference point 61 in the reference coordinate system 100 is P0, then the following equation (4) is fulfilled.

$$P1 \cdot TCP = P0 \quad (4)$$

Next, in place of the unit matrix, the CPU 21 provisionally sets, as the transformation matrix TCP, a matrix X which is previously set and represents the position and orientation of the set point 36 in the tool mounting surface coordinate system 200 (step S4). In other words, the tool center point (the distal end of the tool) 51 is set at the set point 36. Then, the CPU 21 causes the CRT/MDI 25 to display a second message "POSITION SETTING POINT AT REFERENCE POINT" (step S5), and waits for an operation of the teaching key. In response to the second message, the operator manually operates the robot to bring the set point 36 to be coincident with the distal end 61 of the jig (FIG. 3), and then turns on the teaching key. When this key operation is detected (step S6), the CPU 21 determines a matrix P2' representing the position and orientation (second position) of the distal end 51 of the tool in the reference coordinate system in the thus positioned state, on the basis of the joint angles of the individual axes at that time and the transformation matrix TCP (here, the aforesaid matrix X) at that time. Then, the matrix P2' is stored in the RAM 23 (step S7). In this case, the following equation (5) is fulfilled.

$$P2' = P2 \cdot X = P0 \quad (5)$$

where symbol P2 denotes a matrix used in a second embodiment described later.

Then, the CPU 21 determines the transformation matrix TCP in accordance with the following equation (6), derived from equations (4) and (5) and not including the unknown matrix P0, and causes the RAM 23 to store the matrix thus determined. Namely, the tool center point is set.

$$TCP = P1^{-1} \cdot P2' \quad (6)$$

where matrix $P1^{-1}$ is the inverse matrix of the matrix P1.

During an actual robot operation to perform work onto the work object 40, the control unit 20 converts the target position and orientation of the tool 50 expressed in the orthogonal coordinate system into target joint angles of the respective axes, using various transformation matrices including the transformation matrix TCP, and controls the robot mechanism 30 in accordance with the conversion results.

Next, a tool center point setting method according to a second embodiment of the present invention will be explained.

The second embodiment is similar to the first embodiment in that it can be carried out by the robot shown in FIGS. 1 to 3 but different therefrom in that the transformation matrix TCP is derived in accordance with the below-mentioned equation (8) different from equation (6).

Figure 5:
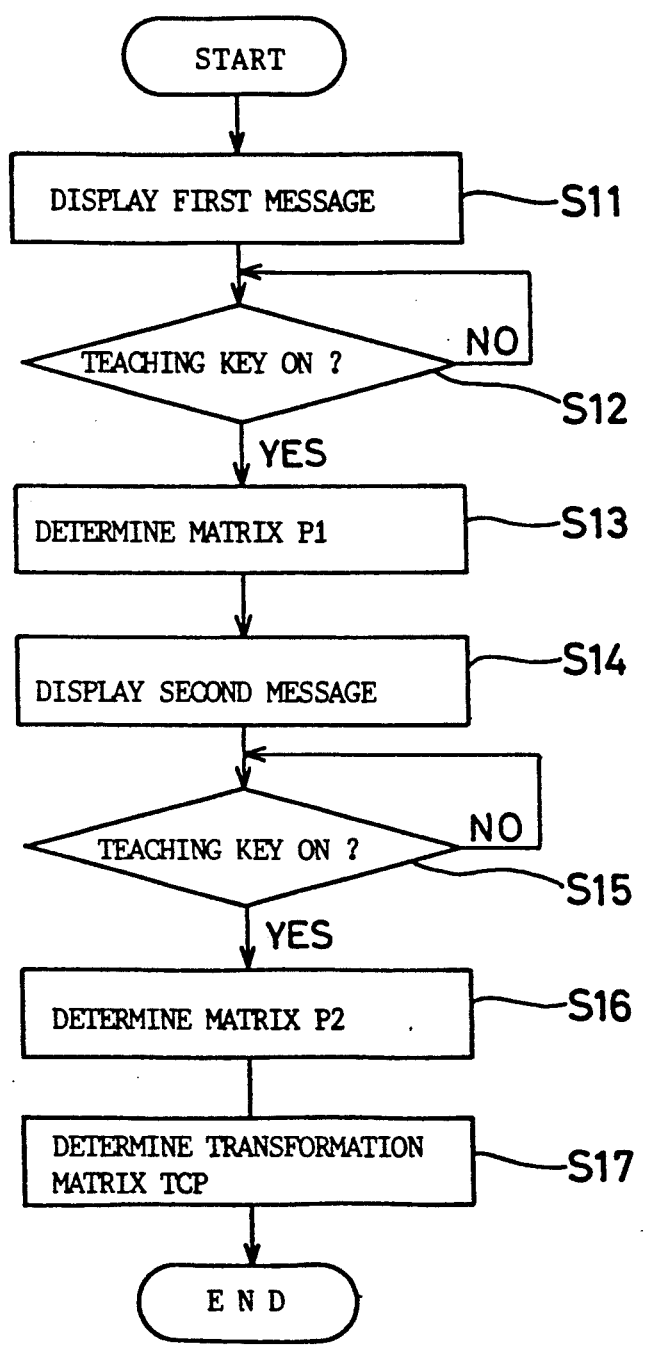
FIG. 5 is a flowchart, similar to FIG. 4, showing a setting method according to a second embodiment of the present invention.

With reference to FIG. 5, a tool center point setting process according to the second embodiment will be described.

When the tool center point setting mode is set, steps S11 to S13 corresponding to steps S1 to S3 in the first embodiment are executed. That is, the tool center point is set at the center of the tool mounting surface and the first message is displayed, and then the matrix P1 representing the first position is determined in accordance with the key operation effected after the tool center point is positioned at the reference point. In this case, the aforementioned equation (4) is fulfilled.

Then, unlike the first embodiment, the CPU 21 causes the second message to be displayed (step S14), without carrying out the setting (step S4) of the tool center point (the distal end of the tool) 51 at the set point 36, that is, with the tool center point kept positioned at the center 35 of the tool mounting surface. Then, when the teaching key is turned on (step S15) after the robot is manually operated in response to the second message so that the set point 36 is positioned at the distal end of the jig (reference point) 61, the CPU 21 determines the matrix P2 representing the position and orientation (second position) of the tool center point 51 in the reference coordinate system in the thus positioned state, on the basis of the joint angles of the respective axes at that time and the aforesaid unit matrix, and causes the RAM 23 to store the matrix P2. At this time, the following equation (7) is fulfilled.

$$P2 \cdot X = P0 \quad (7)$$

Next, the CPU 21 determines the transformation matrix TCP in accordance with the following equation (8) derived from equations (4) and (7). Namely, the tool center point is set.

$$TCP = P1^{-1} \cdot P2 \cdot X \quad (8)$$

This transformation matrix TCP is used for the robot control, as in the first embodiment.

The present invention is not limited to the above-described first and second embodiments and various modifications thereof may be made.

For example, in the above embodiments, the conversion from the tool mounting surface coordinate system to the tool coordinate system is represented by the homogeneous transformation matrix TCP of 4×4, but an equivalent conversion may alternatively be used. Further, although in the above embodiments, cases have been explained, wherein the tool point is provided to be coincident with the distal end of the tool, the present invention can be applied to a robot mounted with a tool whose tool point does not coincide with the distal end of the tool. Furthermore, in the above embodiments, the tool coordinate system whose coordinate origin coincides with the tool center point has been explained by way of example, but such setting of the tool coordinate system is not essential to the present invention.

I claim:

1. A tool center point setting method for deriving a transformation matrix for coordinate conversion from a tool mounting surface coordinate system to a tool coordinate system in a robot having a control unit, comprising the steps of:

(a) providing in a robot a set point whose position and direction relative to a center of a tool mounting surface are known;

(b) providing a reference point in a robot installation space;

(c) setting, in the control unit, a tool center point at the center of the tool mounting surface, positioning the tool center point at the reference point, and teaching, to the control unit, a first position and orientation of the tool center point when the tool center point is positioned at the reference point;

(d) setting, in the control unit, the tool center point at the set point, positioning the set point at the reference point, and teaching, to the control unit, a second position and orientation of the tool center point when the set point is positioned at the reference point; and (e) deriving, in the control unit, the transformation matrix on the basis of an inverse matrix of a matrix representing the first position and orientation, and a matrix representing the second position and orientation.

2. A tool center point setting method according to claim 1, wherein said matrices representing the first position and orientation and the second position and orientation, respectively, are determined on the basis of joint angles of individual axes of the robot assumed at the time of teaching operations in said steps (c) and (d), respectively.

3. A tool center point setting method according to claim 1, wherein said set point is provided at a predetermined portion of the robot so that the set point is positionable at the reference point while a tool is kept mounted to the robot.

4. A tool center point setting method according to claim 1, wherein a coordinate position of the reference point in a reference coordinate system is unknown.

5. A tool center point setting method according to claim 1, wherein said setting of the tool center point at the center of the tool mounting surface in said step (c) is carried out by provisionally setting, in the control unit, the transformation matrix to a unit matrix.

6. A tool center point setting method according to claim 1, wherein said setting of the tool center point at the set point in step (d) is carried out by provisionally setting, in the control unit, the transformation matrix to a matrix representing a position and orientation of the set point in the tool mounting surface coordinate system.

7. A tool center point setting method according to claim 1, wherein said tool center point is a distal end of a tool.

8. A tool center point setting method for deriving a transformation matrix for coordinate conversion from a tool mounting surface coordinate system to a tool coordinate system in a robot having a control unit, comprising the steps of:

(a) providing in a robot a set point whose position and direction relative to a center of a tool mounting surface are known;

(b) providing a reference point in a robot installation space;

(c) setting, in the control unit, a tool center point at the center of the tool mounting surface, positioning the tool center point at the reference point, and teaching, to the control unit, a first position and orientation of the tool center point when the tool center point is positioned at the reference point;

(d) positioning the set point at the reference point while the tool center point kept set, in the control unit, at the center of the tool mounting surface, and teaching, to the control unit, a second position and orientation of the tool center point when the set point is positioned at the reference point; and (e) deriving, in the control unit, the transformation matrix on the basis of an inverse matrix of a matrix representing the first position and orientation, a matrix representing the second position and orientation, and a matrix representing a position and orientation of the set point in the tool mounting surface coordinate system.

9. A tool center point setting method according to claim 8, wherein said matrices representing the first position and orientation and the second position and orientation, respectively, are determined on the basis of joint angles of individual axes of the robot assumed at the time of teaching operations in said steps (c) and (d), respectively.

10. A tool center point setting method according to claim 8, wherein said set point is provided at a predetermined portion of a robot so that the set point is positionable at the reference point while a tool is kept mounted to the robot.

11. A tool center point setting method according to claim 8, wherein a coordinate position of the reference point in a reference coordinate system is unknown.

12. A tool center point setting method according to claim 8, wherein said setting of the tool center point at the center of the tool mount surface in said step (c) is carried out by provisionally setting, in the control unit, the transformation matrix to a unit matrix.

13. A tool center point setting method according to claim 8, wherein said tool center point is a distal end of a tool.

* * * * *